Figures 1, 2:
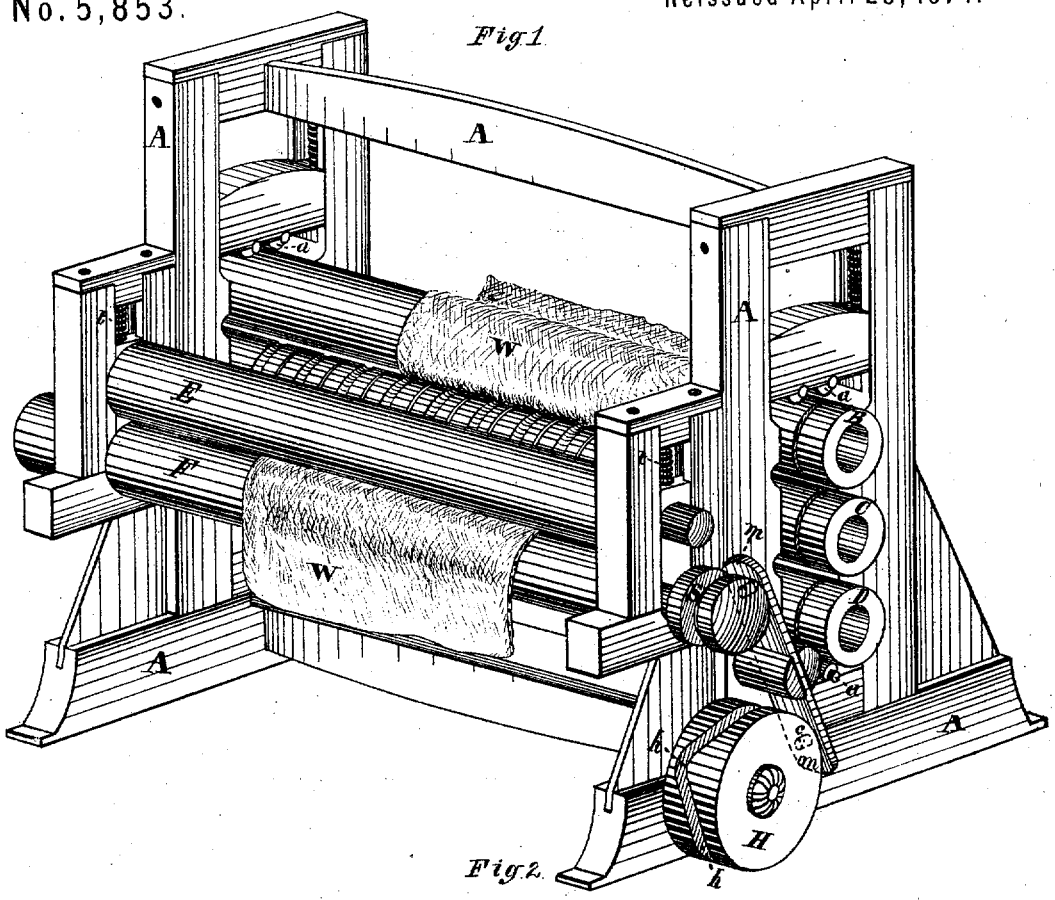

J. E. POLLARD.

Machines for Finishing Felt Fabrics.

No. 5,853. Reissued April 28, 1874.

*Witnesses*
Alfred Rodman
Edw. F. Wilder

James E. Pollard
*Inventor.*

AM. PHOTO-LITHOGRAPHIC Co. N.Y. (OSBORNE'S PROCESS.)

UNITED STATES PATENT OFFICE.

JAMES E. POLLARD, OF NORFOLK, MASSACHUSETTS, ASSIGNOR TO THE ELLIOTT FELTING-MILLS.

IMPROVEMENT IN MACHINES FOR FINISHING FELTED FABRICS.

Specification forming part of Letters Patent No. 147,167, dated February 3, 1874; reissue No. 5,853, dated April 23, 1874; application filed March 21, 1874.

*To all whom it may concern:*

Be it known that I, JAMES E. POLLARD, of the town and county of Norfolk and Commonwealth of Massachusetts, have invented certain new and useful Improvements in Machines for Finishing Felt Fabrics; and I do hereby declare the following to be a full, clear, and exact description of the invention, such as will enable others skilled in the art to which it pertains to make and use it, reference being had to the accompanying drawings, which form part of this specification, in which—

Figure 1 is a perspective view, and Fig. 2 a side elevation.

The object of this invention is to finish felt cloth by passing it through highly-heated calender-rolls, so as to compact and harden the fibers, complete the felting process, give a finished surface to the felt, and impress upon it figures, so as to resemble a woven fabric, and, in certain cases, to cause the cloth to resemble a quilted fabric. The invention consists of a frame, upon which are mounted two sets of rolls, the one set made of hollow cylinders of iron or other metal, so as to be highly heated, and the other set so as to feed the fabric to the heated rolls. One of the feed-rolls is made to vibrate upon the surface of the other, so as to give a jerking motion to the cloth, as hereinafter described.

The following description will enable others to make and use my invention:

In the drawing, A A is the frame, on which is mounted the several parts of the machine. In this frame are two sets of cylinders or rolls. The first set, B C D, are hollow, so as to be heated by a gas or other flame. The middle cylinder C is grooved or engraved with any suitable design, as hereinafter explained. The other set of rolls, E F, are plain. One of them, F, is made to vibrate as it revolves, devices for this purpose being shown, consisting of drum H, with a cam-groove, *h*, on its surface, in which works one of the pins *c c* upon the vibrating lever *m*. The lever *m* is fastened to the frame, as shown. The upper pin *c* works in the groove *s* upon the end of feed-roller F. The roller F is made to receive motion from wheel R, which is fixed upon the same axis as hollow cylinder D. The drum H is made to revolve by any suitable power, and with a variable velocity, as required. Both sets of rolls are mounted so as to give some up-and-down play, so as to produce a yielding pressure to the fabric as it goes through, which may be increased or diminished by means of set-screws. Friction-wheels *a a* are placed upon the cross-heads, so as to relieve the friction of the hollow rolls B and D. Steel, rubber, or other springs *t t* are placed between the cross-heads and the frame, the tension of these being regulated by means of set-screws, so as to give any amount of pressure required. It is necessary that the rolls B, C, and D should be very heavy and strong, so as to bring great pressure and heat to act upon the felt, which constitutes an important feature of my invention.

The operation is as follows: The hollow cylinders B C D are brought to a high temperature, say, from 250° to 275° Fahrenheit, or about the temperature usually given to a flat-iron, goose, or calender for surfacing cloth. The higher the temperature the better, so it is not so high as to injure the fibers of the felt. For heating, I prefer a jet of gas and a blast of air passing through or within the hollow cylinders. The fabric W, in a moist or damp condition, is passed between the calenders C and D, around C, and between the calenders B and C, through which it is fed by the feed-rollers or spreaders E and F.

To make felt resemble a quilted fabric, the roller F is made to vibrate as the cloth passes between the feed-rolls. This gives a jerking motion to the cloth as it passes between the hot rolls. Those parts of the fabric which are grasped between the raised portions of roll C and the roll D are so firmly held that a series of puckers, resulting from the wrenching the felt, are formed in those parts of the fabric which are impressed and smoothed by the raised portions of the roll C, the felt thus having imparted to it a puffy or quilted look. This method of producing an imitation of quilted fabric from felt, by giving a vibrating or jerking motion to the fabric as it passes between highly-heated calender-rolls, constitutes the main feature of my invention.

I have described the best apparatus and process for carrying out the several parts of my invention with which I am acquainted; but I do not limit myself to the exact devices, as some others may be substituted for certain parts at will, especially in the gearing, the frame, the mode of heating, and in the devices for giving a vibrating motion to the feed-roll F. By throwing the vibrating mechanism out of gear, the feed-rolls will feed the felt at any required speed to the engraved calender, around which the felt passes. This keeps the felt for a long time in contact with the heated metal; and, as the felt is moist or damp, it is solidified and highly finished at the places that are clamped between the heated rolls. The other parts of the felt—that is, such as are over the depressions in the middle roll—remain loose and more or less spongy, and hence seem to have a different color from the depressed and solidified portions, thus producing, by the operation of my machine, imitations of woven cloth.

I am aware that felt cloth has been fed evenly and regularly between steam-heated calenders, such as are used for calendering paper. This, however, does not change the character of the felt, but simply smooths or irons it; and, also, that a felt fabric has been passed between rolls, one of which has been engraved with a shallow pattern. But by my invention, the high pressure and the high temerature of the rolls, the operation of the deeply-engraved calender, and the vibrating motion of the feed-roll, a marked and distinct character is imparted to the felt, so as to clearly distinguish felt which has been subjected to the operation of my machine from that to which it has not been applied.

It is obvious that, while a gang of three or more rolls is desirable, because of the extent of surface contact afforded, two rolls only are essential to the carrying out of my invention.

Having thus described my invention, what I claim, and desire to secure by Letters Patent of the United States, is—

1. The improved machine herein described for finishing felt cloth, consisting of a frame, A, hollow calender-rolls B and D, grooved roll C, and feed-rolls E and F.

2. In a machine for finishing felt cloth, the feed-roll E, combined with the vibrating feed-roll F, substantially as and for the purpose described.

3. In combination with two or more hollow rolls, one or more having grooved or deeply-engraved surfaces, the felted roll E, and vibrating roll F, substantially as set forth.

4. The combination of the hollow cylinders B C D with frame A, and cross-heads provided with friction-rolls *a a* and springs *t t*, as set forth.

In testimony that I claim the foregoing I have hereunto set my hand.

JAMES E. POLLARD.

Witnesses:
ROBERT THOMAS,
E. F. WILDER.